United States Patent [19]

Dries et al.

[11] 4,313,910

[45] Feb. 2, 1982

[54] SEPARATION OF GASES FROM PARTICLE STREAMS

[75] Inventors: Hubertus W. A. A. Dries; Ferdinand Dane, both of Amsterdam, Netherlands

[73] Assignee: Shell Oil Company, Houston, Tex.

[21] Appl. No.: 164,974

[22] Filed: Jul. 1, 1980

[30] Foreign Application Priority Data

Jul. 2, 1979 [GB] United Kingdom ............... 22994/79

[51] Int. Cl.³ .......................... B01J 8/24; F27B 15/02; B07B 7/04
[52] U.S. Cl. ..................................... 422/147; 55/265; 55/455; 209/143; 209/144
[58] Field of Search ....................... 422/139, 147, 310; 209/143, 144; 55/261, 265, 455

[56] References Cited

U.S. PATENT DOCUMENTS

| | | | |
|---|---|---|---|
| 2,849,384 | 8/1958 | Voorhies, Jr. et al. | 422/139 X |
| 2,884,303 | 4/1959 | Metrailer | 422/139 X |
| 3,535,850 | 10/1970 | Von Ohain et al. | 55/261 |
| 4,043,899 | 8/1977 | Anderson et al. | 208/161 |
| 4,146,359 | 3/1979 | Lampkin et al. | 55/261 X |
| 4,212,653 | 7/1980 | Giles | 55/261 X |
| 4,219,407 | 8/1980 | Haddad et al. | 208/161 X |
| 4,249,655 | 2/1981 | Patureau et al. | 209/144 |

FOREIGN PATENT DOCUMENTS

| | | |
|---|---|---|
| 422865 | 1/1935 | United Kingdom . |
| 427351 | 4/1935 | United Kingdom . |
| 766860 | 1/1957 | United Kingdom . |
| 774543 | 5/1957 | United Kingdom . |

*Primary Examiner*—Michael S. Marcus

[57] ABSTRACT

An apparatus for separating a carrier gas from a particle stream is disclosed which comprises deflecting said particle stream about a curved surface to compact the stream and separate therefrom a major proportion of said carrier gas, and introducing a substitute fluid into said compacted stream via at least one aperture in said curved surface to displace substantially the remainder of the carrier gas from the spaces between the particles. The invention is usefully applied for rapid disengagement of gases from a particulate stream, particularly in the catalytic cracking of hydrocarbons.

6 Claims, 5 Drawing Figures

SEPARATION OF GASES FROM PARTICLE STREAMS

BACKGROUND OF THE INVENTION

This invention relates to a process for improving the separation of gases from particle streams, and to an apparatus for carrying out such a process. As used in this specification, "particle streams" shall mean streams in which the particles are conveyed, generally by means of a gas, and wherein the particles constitute an appreciable part of the volume of the stream—as opposed to, for example, the presence of solid particles on a relatively small scale, such as in flue gases and the like. In this specification the term "gas" shall include a vapor.

Where there is a difference between the density of the gas and the density of the particles, the gas has conventionally been separated from the particles by deflecting the stream over a curved surface so that the denser of the two, generally the particles, is compacted or compressed as a result of the centrifugal forces so that the gas is, in effect, squeezed out from between the particles. This is the case with a centrifuge. There are other, more specific, examples which will be referred to below.

In the case of conventional installations, while the great majority of the gas can be removed from the particle stream, there still remains a small amount of the gas trapped in the spaces between the particles. Where the gas is valuable, or where the quantities involved are large, or both, removal of this residual gas could be worthwhile if a way could be found to achieve it economically.

A solution to this problem is proposed in accordance with the invention whereby a substitute gas is introduced into the particle stream in order substantially to replace the carrier gas remaining in the spaces between the particles once the greater part of the carrier gas has been removed from the stream.

SUMMARY OF THE INVENTION

According to the invention, there is provided a process for separating a carrier gas from a stream of particles, said particles having a density in excess of that of the carrier gas, which process comprises deflecting the stream to follow a curved surface so that the particles tend to compact due to the resulting centrifugal force and to release a major proportion of the entrained carrier gas, and introducing a substitute fluid through one or more apertures in the curved surface in order to substantially replace the carrier gas remaining in the spaces between the particles.

The invention provides for an apparatus for separating carrier gas from a stream of solid particles, said particles having a density in excess of the density of said carrier gas which apparatus comprises: an inlet conduit adapted for connection to a source of a stream of particles in a carrier gas; said inlet conduit having an inlet end and an outlet side, a curved surface disposed downstream of said outlet side of said inlet conduit to make contact with a particulate stream traversing said inlet conduit whereby said stream impinges substantially tangentially onto said curved surface, said curved surface containing at least one aperture adapted for connection to a source of substitute fluid, for displacing carrier gas from said stream impinging onto said surface.

DESCRIPTION OF PREFERRED EMBODIMENTS

Figure 1:
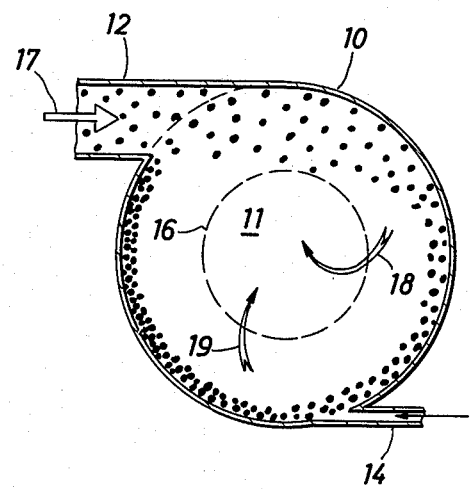
FIG. 1 is a diagramatic plan of a cyclone adapted to be used in accordance with the invention.

While the substitute gas is conveniently introduced through the curved surface its velocity at entry should be in the same order of magnitude as that of the particle stream, and should be kept close to but preferably lower than that of the particle stream.

The substitute gas is conveniently superheated steam. In terms of mass flow for a typical particle grading at a temperature of 500° C. and 100% purge efficiency at a pressure in the order of 3 bar abs. as little as ½ kg steam may be sufficient to replace the gas contained between one ton of the particles at their point of closest compaction or maximum bulk density. In practice, it is found that the efficiency is likely to be in the order of 40 to 50%, so that somewhat more than 1 kg steam will be required per ton of particles. The final choice as to the amount of steam used per ton of particles will depend largely on the marginal rate of recovery of the carrier gas and its value compared with the cost of the steam.

The invention is suitable for use in cyclones, particularly where the particle stream is at elevated temperature.

Where the particle stream is at elevated temperature it may be advantageous to bleed a small quantity of vaporizing liquid through the curved surface in place of the substitute gas. The liquid will evaporate immediately and thus have the same effect as if the substitute gas had been introduced as specified above.

The invention may also be usefully applied to the hood or inverted pot at the top of a reactor-riser in a catalytic cracking installation such as may be found in an oil refinery. In such an installation the cracked hydrocarbons in gaseous form have to be separated rapidly and efficiently from the catalyst particles at the top of a riser. This may be done by means of a curved hood which deflects the particles downwardly while the lighter gas is squeezed out from between the particles and rises to be withdrawn. In a conventional installation the falling particles leaving the hood entrain a non-negligable amount of product-gas. By applying the invention this quantity can be substantially reduced, it being the substitute gas which is entrained in its place. Cracking catalysts typically comprise natural or synthetic zeolites and clays and refractory oxides such as silica, alumina, magnesia, thoria, boria and mixtures thereof.

The invention extends to apparatus for performing the above process. Such apparatus comprises a curved surface over which in operation is passed a particle stream comprising entrained particles and a carrier gas, and is characterized in that the curved surface is provided with one or more openings through which a substitute gas or a vaporizing liquid can be introduced. The opening(s) is/are dimensioned such that at the desired flow rate the velocity of the substitute gas or vaporizing liquid will not substantially exceed that of the particle stream at that point, and will preferably be lower.

The openings of which there may be from one to, say, ten or twelve, but more often two or three, may comprise ports through which the substitute gas may be introduced substantially tangentially to the flow of the particle stream. Alternatively, the curved surface may be formed with a small step or steps as openings, so that it resembles in shape the inside of a clinker-built boat, the flow being in the direction that the particle stream and the substitute gas combine at each step rather than impinge upon one another.

The opening may in another form comprise a porous section of the curved surface.

The opening or openings is/are advantageously disposed approximately diametrically opposite the entry of the particle stream in the case of a centrifuge. In the case of a hood for a riser the opening(s) may be located from about 90° from the inlet.

The efficiency of the displacement of the residual carrier gas will depend very much on the disposition of the openings and the nature of the particles. One useful side effect which may be found is that because some of the carrier gas remains close to the wall due to a boundary layer effect, wear of the curved surface by abrasive particles may be quite noticeably reduced.

The invention will now be further described by way of example with reference to the accompanying drawings.

FIG. 1 shows the curved circumferential surface 10 of a cyclone 11 at the level of its inlet 12 for a particle stream and a port 14 for the introduction of a substitute gas. The gas exit 16 from the cyclone is indicated by a broken line.

As shown a particle stream 17 comprising particles and a carrier gas enters the cyclone through the inlet 12 substantially tangentially to the curved circumferential surface 10 at its point of entry. As the stream follows the circumference it compacts due to the centrifugal force thus squeezing the carrier gas out from between the particles. At a point where the majority of the carrier gas, as represented by the large arrow 18, has been removed from the stream, a substitute gas is introduced through the aperture or port 14 and replaces at least a part of the carrier gas (as represented by the small arrow 19) remaining between the particles even after the majority of the gas has been released due to the centrifugal compacting.

Figure 2:
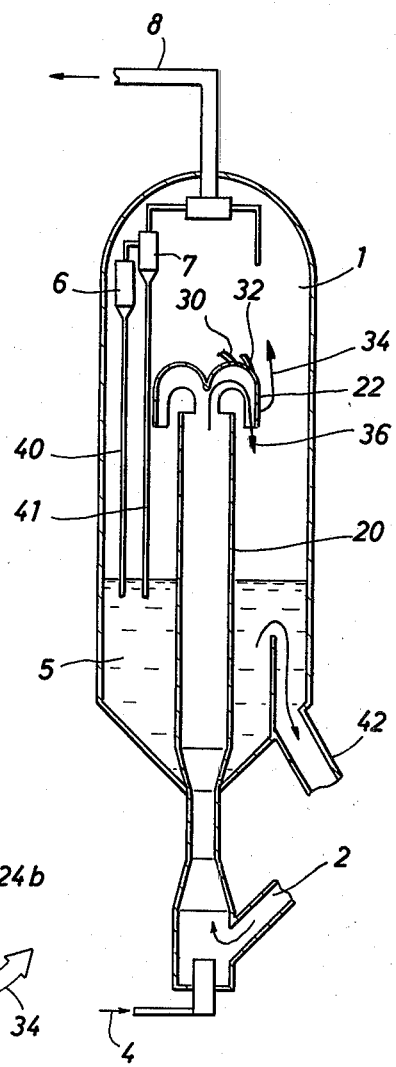
FIG. 2 is a longitudinal section of a catalytic cracking reaction vessel in which an apparatus according to the invention might suitably be employed.
Figure 3:
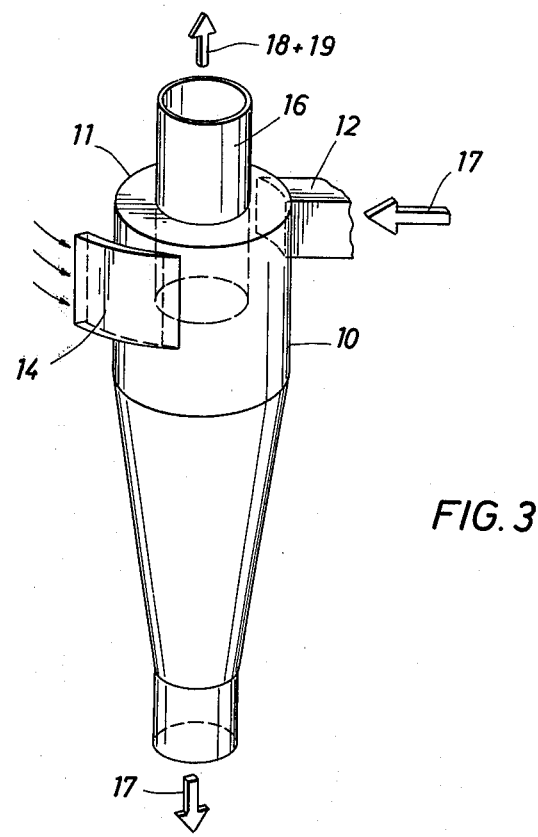
FIG. 3 is a perspective view of a cyclone in accordance with the invention.

The actual arrangement of the cyclone and the additional port 14 may be seen clearly from the perspective view of FIG. 3. In FIG. 2 1 is the reactor of a catalytic cracking unit. At 2 fresh catalyst particles are introduced into riser 20. The gaseous feed is introduced at 4. A major part of the cracking reaction takes place in the riser. The catalyst particles separated from the gaseous feed collect as a mass at the bottom part 5 of the reactor.

The dispersion of catalyst particles and gas rising through riser 20 impinges on hood 22 containing openings 30 and 32 connected to a source of substitute gas (not shown). The solid particles leave the hood in direction 36, the gas in direction 34. A double row of cyclones 6 and 7, of which one is shown for either row, take care of the discharge of gaseous product and substitute gas through outlet 8. Separated catalyst particles go downwards through the lower diplegs 40 and 41. Spent catalyst particles are discharged at 42 to the stripper and regenerator (not shown).

Figure 2A:
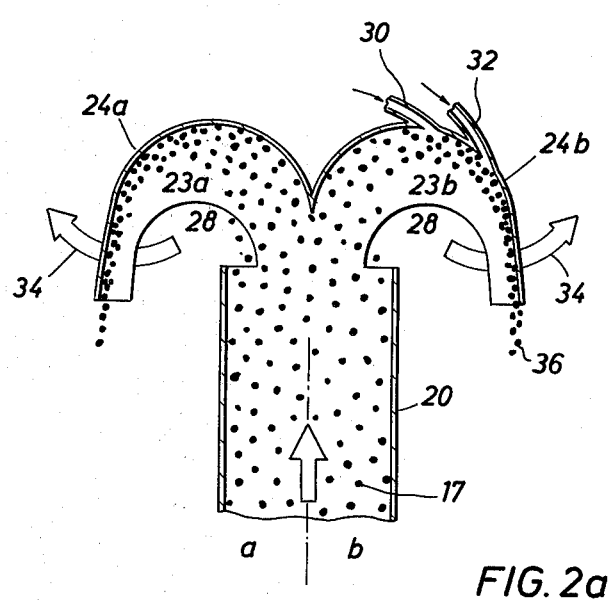
FIG. 2a is an enlarged diagramatic side elevation of the upper end of the riser with its hood in accordance with the invention.

FIG. 2a shows the upper end 20 of a riser of a catalytic cracking installation together with its hood 22. For the sake of explanation the diagram has been divided into two halves; the left hand side a, not in accordance with the invention, and the right hand side b in accordance with the invention.

The hood is designed to cover the outlet of the riser completely so that the particles in the particle stream 17 are deflected downwardly by the hood.

The hood, as shown, has two arms 23 each comprising a curved outer surface 24 of substantially parabolic shape and a skirt 26 which channels a particle stream leaving the riser onto the curved surfaces 24. The skirts 26 are cut away at 28 to make for better exhaustion of the carrier gas. The curved surface 24$b$ of the right hand arm 23$b$ is provided with two openings 30, 32 through which a substitute gas may be introduced in accordance with the invention. The hood which may contain from 1 to 6 arms may contain 1 to 3 apertures in each arm.

As will be seen the entry of the substitute gas is substantially tangential to the flow of the particle stream. The outflow of the carrier gas is represented by an arrow 34 and that of the purged particle stream by 36.

Figure 4:
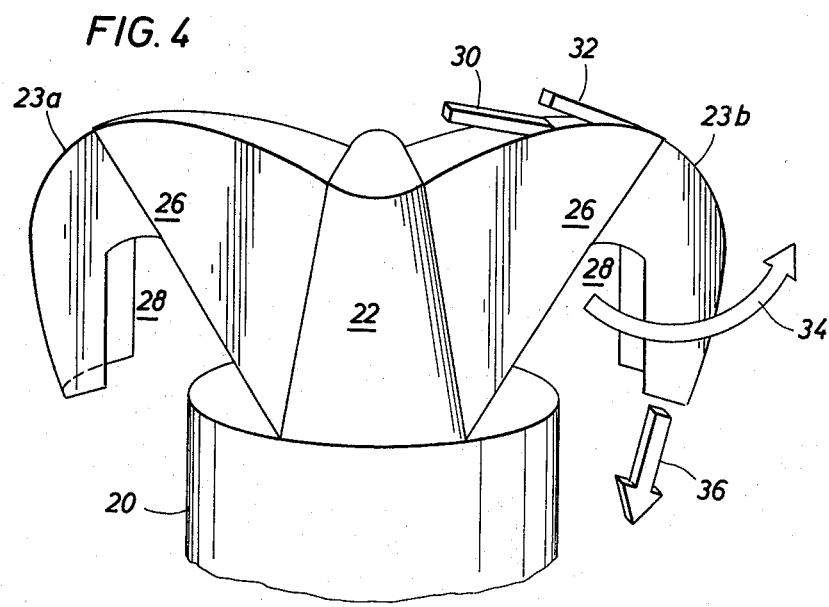
FIG. 4 is a perspective view of the upper end of a riser of a catalytic cracking installation with its hood in accordance with the invention.

The actual arrangement of the hood will be better understood in referring to the perspective view in FIG. 4. A preferred embodiment of the invention comprises a catalytic cracking reactor for separating a carrier gas from a stream of particles, said particles having a density in excess of that of the carrier gas, which process comprise deflecting the stream to follow a curved surface so that the particles tend to compact due to the resulting centrifugal force and to release a major proportion of the entrained carrier gas, and introducing a substitute fluid through one or more apertures in the curved surface in order to substantially replace the carrier gas remaining in the spaces between the particles.

EXAMPLE

In order to illustrate the effect of the invention, and by way of example only, a particle stream such as one to be found in a catalytic cracker will be considered.

For a rate of catalyst flow of say 20 ton/min at a temperature of 500° C. and a pressure of 2.7 bar, after its initial compaction the catalyst whose particles have a density of 1400 kg/m$^3$ has a bulk density of 700 kg/m$^3$. Ignoring the contribution to the bulk density of the hydrocarbon carrier gas, only half the volume of the stream is occupied by the catalyst particles themselves. The other half is thus occupied by the valuable hydrocarbon carrier gas, which at a molecular weight of say 95 and at the said conditions, will amount to some 84 ton/day.

At 100% efficiency, i.e., if all the substitute gas replaces all the carrier gas, some 0.55 kg steam will be required per ton of catalyst. In other words 0.8 ton steam per day will be required per ton of catalyst per minute.

At 40% efficiency, 1.4 kg steam will be required per ton of catalyst or 2 ton steam per day for each ton of catalyst per minute.

What is claimed:

1. A catalytic cracking reactor comprising an upright enclosed vessel defining a lower zone for fluidized catalyst and an upper zone for separation of catalyst particles from hydrocarbon vapors, an upright riser conduit extending into said lower portion of said reactor forming an upwardly directed cracking path and communicating at the upper outlet with the interior of said reactor, a curved hood disposed substantially horizontally above said riser conduit and communicating with the interior of said riser conduit and the interior of said reactor for changing the direction of flow of catalyst particles in an upflowing carrier gaseous stream within said riser conduit from more than 90° up to about 180° with respect to said upflowing carrier gaseous stream, at least one conduit disposed on said curved hood, said at least one conduit communicating with the lower surface of said curved hood, and adapted for connection to a source of substitute fluid, for displacing carrier gas from said particulate stream.

2. Apparatus as in claim 1 in which at least one conduit is situated at or near the point at which in operation the bulk density of the particle stream approaches its highest value.

3. Apparatus as in claim 1 wherein said curved hood comprises from 1 to 6 arms, each containing at least one conduit adapted for connection to a source of substitute fluid.

4. Apparatus as in claim 3 wherein each arm comprises a downwardly projecting skirt at its rim to enhance the flow of catalyst over the curved surface of said arm.

5. Apparatus as in claim 4 in which the skirts are cut away in order to facilitate the rapid escape of the carrier gas from the particle stream.

6. A catalytic cracking reactor comprising an upright enclosed vessel defining a lower zone for fluidized catalyst and an upper zone for separation of catalyst particles from hydrocarbon vapors, an upright riser conduit extending into said lower portion of said reactor forming an upwardly directed cracking path and communicating at the upper outlet with the interior of said reactor; a curved hood disposed substantially horizontally above said riser conduit and communicating with the interior of said riser conduit and the interior of said reactor for changing the direction of flow of catalyst particles in an upflowing carrier gaseous stream within said riser conduit from more than 90° up to about 180° with respect to said upflowing carrier gaseous stream, at least one conduit disposed on said curved hood, said at least one conduit communicating with the lower surface of said curved hood and adapted for connection to a source of substitute fluid for displacing carrier gas from said particulate stream, and at least one cyclone separator disposed in said reactor above said curved hood, said at least one cyclone separator having a conduit communicating tangentially with the inner curved surface thereof and adapted for connection to a source of substitute fluid for displacing carrier gas from catalyst particles within said cyclone separator.

* * * * *